US009035486B2

(12) United States Patent
Asplund (10) Patent No.: US 9,035,486 B2
(45) Date of Patent: May 19, 2015

(54) SYSTEM ADAPTED FOR ONE OR MORE ELECTRICALLY PROPELLABLE VEHICLES (DETECTOR ARRANGEMENT)

(75) Inventor: Gunnar Asplund, Solna (SE)

(73) Assignee: Elways AB, Solria (SE)

( * ) Notice: Subject to any disclaimer, the term of this patent is extended or adjusted under 35 U.S.C. 154(b) by 309 days.

(21) Appl. No.: 13/638,462

(22) PCT Filed: Mar. 31, 2011

(86) PCT No.: PCT/SE2011/050383
§ 371 (c)(1),
(2), (4) Date: Sep. 28, 2012

(87) PCT Pub. No.: WO2011/123052
PCT Pub. Date: Oct. 6, 2011

(65) Prior Publication Data
US 2013/0020866 A1 Jan. 24, 2013

(30) Foreign Application Priority Data
Apr. 1, 2010 (SE) ...................................... 1000329

(51) Int. Cl.
*B60L 5/00* (2006.01)
*B60M 1/36* (2006.01)
*B60L 5/40* (2006.01)

(52) U.S. Cl.
CPC .. *B60M 1/36* (2013.01); *B60L 5/40* (2013.01); *B60L 2200/26* (2013.01)

(58) Field of Classification Search
CPC .............. B60L 5/00; B60L 5/40; B60M 1/36; B60M 1/30
See application file for complete search history.

(56) References Cited

U.S. PATENT DOCUMENTS 3,914,562 A * 10/1975 Bolger ............................ 191/10
4,041,324 A * 8/1977 Tashiro et al. .................. 307/91

(Continued)

FOREIGN PATENT DOCUMENTS

EP 0950558 A1 10/1999
GB 2464279 A 4/2010

(Continued)

OTHER PUBLICATIONS

International Search Report issued on Jun. 30, 2011 by the SE International Searching Authority in International Application No. PCT/SE2011/050383.

(Continued)

*Primary Examiner* — Jared Fureman
*Assistant Examiner* — Terrence Willoughby
(74) *Attorney, Agent, or Firm* — Raymond R. Ferrera; Adams and Reese LLP (57) ABSTRACT A detector arrangement related to a contact device in a system for driving an electrically propellable vehicle along a roadway. The system comprises a plurality of road sections subdividing the roadway, each one connected to one or more electric stations for charging a set of batteries of the vehicle and/or supplying the necessary power and energy for driving the vehicle forward.
The contact device comprises displaceable current collectors disposed underneath the vehicle, which are moveable up and down and sideways. The current collectors are coordinated with control equipment to bring the current collector into mechanical and electrical contact with conducting rails arranged in a track in the roadway. The detector arrangement comprises one or more coils and is adapted to sense the variation of a magnetic field generated by additional electrical conductors disposed in the track.

9 Claims, 5 Drawing Sheets

(56) References Cited

U.S. PATENT DOCUMENTS

| | | | |
|---|---|---|---|
| 4,969,400 A | * | 11/1990 | Burg et al. .................... 104/247 |
| 5,764,127 A | | 6/1998 | Hore et al. |
| 6,011,508 A | * | 1/2000 | Perreault et al. .............. 342/350 |
| 8,544,622 B2 | * | 10/2013 | Vollenwyder et al. .......... 191/10 |

FOREIGN PATENT DOCUMENTS

| WO | 93/10995 | 6/1993 |
|---|---|---|
| WO | 2007/056804 A1 | 5/2007 |

OTHER PUBLICATIONS

Written Opinion of the International Searching Authority issued on Jun. 21, 2011 by the SE International Searching Authority in International Application No. PCT/SE2011/050383.

\* cited by examiner

SYSTEM ADAPTED FOR ONE OR MORE ELECTRICALLY PROPELLABLE VEHICLES (DETECTOR ARRANGEMENT)

TECHNICAL FIELD OF THE INVENTION

This invention refers generally to a detector arrangement, with said arrangement being adapted to sense and evaluate a magnetic field caused by one or more magnetic field generating electric conductors, said detector arrangement, being related to vehicles, specifically to such vehicles, which is adapted to be able to elevate and lower vehicle-related contact means and/or a contact device, such as current collector with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway, wherein the upper surface of this stretch of the roadway exhibits at least one track in the form of a groove and in which track two or more parallel electric conductors or strips with a conductor surface which may be placed under power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy external to vehicles so as thereof i.a. to charge batteries belonging to vehicles and/or sets of batteries intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy, supplying the power and the energy which will be required for a chosen power requirement for driving the vehicle upwards and over an upwardly rising portion of the roadway.

More particularly the present invention refers to such system in which a non-rail-bound vehicle, such as a freight vehicle, while being driven along chosen roadway sections or portions by means of the set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said tracks (not the conductors) extending continually from roadway section or portion to roadway section or portion.

The voltage which is allotted to these conductors can be an alternating voltage (AC power) (with a vehicle-related rectifier) or a direct voltage (DC power). In choosing a DC power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in anti-phase and symmetrically around a ground potential or zero potential.

The motor intended for driving the vehicle can be of the DC power type or of the AC power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by guiding control equipment associated with the vehicle.

The present invention is based on and is intended to be used in the latter category and technology and is intended to be applied primarily to heavy trucks with or without connected trailers, wherein from Patent Publication U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subjected to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

FIGS. 2 and 3, respectively, in the mentioned Patent Publication describe a vehicle-related table (98), to which an arm (10) is rotatably attached (94, 96, 99). Sensors (30) allotted to the table (98) generate signals which with regard to their phase and magnitude indicate the direction to and distance from an axis (99) of rotation to a slit (12) in the cover plate (20) which is based on changes in a generated magnetic field.

The table (98) and arm (10) can be driven over a designated mechanism (31) by a motor (32) between predetermined limits and limit switches (40, 41) positioned there.

Patent Publication WO 93/10995-A discloses an earlier known system for driving electrically controllable vehicles along a road and its roadway sections or portions.

FIG. 9 in the mentioned Patent Publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short-circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short-circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having an equal length and are to be positioned behind each other in the direction of motion of the vehicle with equal mutual free and intermediately lying spaces (302a-302e).

The remainder of the Patent Publication shows the existence of a single conductor or rail subjected to voltage in a road section (Page 5, lines 11-13) and that a vehicle is to attract a voltage to a roadway section lying in front (page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion lying therebelow.

As examples of this known technology reference is also made to the contents of Patent Publications U.S. Pat. No. 3,914,562-A and U.S. Pat. No. 4,007,817-A, respectively.

Patent Publication WO 2007/056 804 A1 describe and disclose a plurality of means, devices and/or arrangements which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated under the following subsections;

a. Pairs of electrically conductive contacts or strips oriented along a roadway.
b. Switching means to supply DC power to a roadway related pair of electrically conductive contacts or strips. (DC network).
c. Vehicle related transmitter.
d. Vehicle related pick-up arms.
e. DC voltage difference between roadway related conductors, contacts or strips.
f. Orientation of the roadway related conductive strips.
g. Power supply system.
h. Detector means or arrangements.
i. Power supply to an adjacent pair of conducting strips.
j. Sensor arrangements.
k. Conditions for activating switching means.
l. Battery arrangements.
m. On-board charging engine.
n. Overload cut-off and re-close switch.
o. Safe conditions of bare electric roadway related electric conductors or strips.
p. Use of DC voltage or AC voltage to supply power to the roadway related electric conductors or strips.
q. Magnetic field sensor.
r. Snow plough and blower arrangements.
s. Electrical heating tape.

a. Pairs of Electrically Conductive Conductors or Strips Oriented Along a Roadway.

It is suggested in the above-mentioned International Patent Publications that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply DC Power to a Roadway Related Pair of Electrically Conductive Contacts or Strips (DC-Network).

A source of direct current electricity (DC network) is arranged to provide DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publications further mention (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC network) was applied to each section or portion.

c. Vehicle-Related Transmitter.

When an appropriate electrically powered vehicle travels over the respective sections of copper strip, a transmitter mounted to the vehicle turns on the power supply to the section of copper strips over which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries in the vehicle).

The electricity supply to each copper strip is turned on only during 1.5 seconds, i.e. the time period during which the vehicle passes over that section of copper strips.

In the absence of a signal from a vehicle, the power to that section of copper strips remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50 having wheels 52, 54 is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pick up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30; page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC-Voltage Difference Between Roadway Related Conductors, Contacts or Strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to ground that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from ground (the road surface). Suitably, the electrically conductive strips are laid onto an adhesive insulating base which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means of Arrangement.

The switching means is suitably operatively associated with a detector means for detecting the presence of a vehicle, either about to move on to a pair of conductors or strips or on a pair of conductors.

For example, the coded signal may comprise an oscillating voltage similar to that used by utility companies for control purposes.

Such a control signal may have a frequency in the order of 400 kHz and a voltage of about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors at a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor, positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such, that the signal that is used to turn on the next pair of conductive strips must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips, whenever there is a break and then a resumption of the on-road conductors or strips. (Page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and re-close switch. This switch suitably operates on the DC side of the transformer and a rectifier.

Each DC output line from the transformer and rectifier may have independent overload switches.

The overload cut-out and re-close switches may be set such that, if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC power, to give a positive DC power to one conductor or strip and an equal negative DC power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (Page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested to use an electrical heating tape beside each conductor or strip to aid the clean removal of snow and ice in winter time. (Page 22, lines 1-3.)

This invention is concentrated on a detecting arrangement for being able to detect the existence of and the orientation of a track oriented along a stretch of a roadway and its roadway portion and having its upwardly open tracks connecting to each other from roadway section to roadway section with two or more parallel electric conductors placed therein, such as being shaped with uninsulated surface sections in each section of the roadway, and concerns structuring the detecting arrangement for ensuring cooperation between a current collector, related to the vehicle, and the track while utilizing a magnetic field generated along the roadway section and being able to be sensed by coils related to the vehicle, the output signals of which coils are processed by control equipment.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology, as it has been described above, it should therefore be seen as a technical problem to be able to understand the significance of, the advantages related to and/or the technical measures and considerations which will be necessary to expose a system for conveying an electrical, and by i.a. one or more batteries in a set of batteries, propel able vehicle along a stretch of a roadway and its roadway portions, which system is to comprise; "a" a plurality of roadway sections or portions for subdividing the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated roadway sections so as to therein offer a possibility of choosing the lengths of the conductors and roadway sections in response to established requirements of a "continuous" supply of energy to the vehicle and its set of batteries and wherein the lengths of the respective roadway sections to advantage can be chosen considerably longer than the total length of the vehicle, so that no adaptation of the lengths of the roadway sections to any standard lengths of the vehicles will be required such as in known technology.

There is a technical problem in at a vehicle, which on its underneath side has been provided with contact means or current collector displaceable upwards and downwards and sideways, counted across the direction of transportation of the vehicle, said elongated tracks or gaps are extending, via roadway section to roadway section, beneath the driving path of the roadway sections and its conductors, such as rails, which may be supplied by current and may be subjected to voltage, with said contact means being coordinated with a detecting arrangement, which is adapted to determine or detect the existence of and the orientation of a track, disposed along the stretch of roadway, and with said detecting arrangement related to a control equipment of the vehicle so as to create an adaptation of said contact means to at least offer a mechanical and electrical contact to said conductor, to be able to understand the significance of, the advantages related to and/or the technical measures and considerations which will be required for creating a coordination between at least two conductors allotted to the roadway section and being able to be subjected to voltage on the one hand and the contact means of the vehicle over coordinated drag or roll contacts, such as contact springs, for electric cooperation with the respective ones of the conductors, which may be subjected to tension, or the rails and that a roadway section supporting the vehicle will, over its conductors and its external electric source of energy, charge the set of batteries from a coupling means or its allotted switch.

There is a technical problem in being able to understand the significance of, the advantages related to and/or the technical measures and considerations which will be required for disposing to said track in the roadway one or more electric conductors which a current (a direct current), said current is adapted to pass for generating a magnetic field and/or using for required magnetic field a number of magnets with permanent magnetization.

There is a technical problem in being able to understand the significance of, the advantages related to and/or the technical measures and considerations which will be required for letting a coil related to the vehicle be adapted, by its motion along and crosswise to the track, to sense the magnetic field.

There is a technical problem in being able to understand the significance of, the advantages related to and/or the technical measures and considerations which will be required for letting a control equipment affect a current collector over associated auxiliary motors for cooperation with the track and the conductors which are introduced into the track and which may be subjected to electric voltage.

There is a technical problem in being able to understand the significance of, the advantages related to and/or the technical measures and considerations which will be required for letting the distance, between the conductors and/or the magnets and the coil or coils which are related to the vehicle, be adapted to a value which is to be lower than 15 centimeters, such as between 10 and 1 centimeters.

There is a technical problem in being able to understand the significance of, the advantages related to and/or the technical measures and considerations which will be required for letting said coil or coils consist of two separate coil sections disposed adjacent to each other, such as crosswise of the driving direction of the vehicle, and then being dimensioned for equal and opposing currents.

There is a technical problem in being able to understand the significance of, the advantages related to and/or the technical measures and considerations which will be required for letting the control equipment be adapted, over internal circuit arrangements and over calculating circuits, to be able to determine when the magnetic field in a coil has increased and begins to decrease and to let that criterion affect auxiliary, motors to lower the current collector to a contact with conductors, subjected to voltage.

There is a technical problem in being able to understand the significance of, the advantages related to and/or the technical measures and considerations which will be required for letting the control equipment be adapted, over internal circuit arrangements and over calculating circuits, to be able to determine when the magnetic field of one of the coils has increased and begins to decrease, and to let that criteria be calculate, and that a maximized magnetic field with the assistance of a magnetic field stored for an other coil and to affect auxiliary motors to lower the current collector to a contact with conductors, subjected to voltage.

There is a technical problem in being able to understand the significance of, the advantages related to and/or the technical measures and considerations which will be required for letting the control equipment be adapted over internal circuit arrangements and over calculating circuits to be able to determine and/or discern an occurring minimum value or a maximum value valid for identifying a real track from false values valid for false tracks.

There is a technical problem in being able to understand the significance of, the advantages related to and/or the technical measures and considerations which will be required for letting two coils be disposed at the same distance from each other and from parallel electric conductors or magnets related to or adjacent to the track in their roadway sections.

The Solution

As its starting point this invention utilizes the known technology indicated by way of introduction and which is based on a vehicle-related detector arrangement, related to a control unit and a vehicle-related charging system for being adapted in an electrically, i.a. by one or more batteries or a set of batteries, conveyable vehicle being driven along a stretch of a roadway and its associated roadway sections or portions, wherein this system may comprise; "a" a plurality of roadway sections or portions subdividing the extension or stretch of the roadway, wherein each one of these roadway sections or portions is allotted one or more elongated tracks, grooves or slots having introduced therein conductor bare surfaces such as conductors or strips, which may be supplied with power or current and which may be placed under voltage by means of a switch to one or more power sources external to the vehicle, such as electric stations, so as to thereby be able to charge said set of batteries allotted to the vehicle, but primarily over said set of batteries driving the vehicle along the extension of the roadway and its roadway portions, and "b" one or more vehicles which may be driven by an electric motor or motors and wherein the respective vehicles exhibit a power control circuit for required power adapted for creating a required power and/or speed control, wherein said vehicle on its underneath side is provided with an up and down and sideways, respectively, counted crosswise to the direction of transportation of the vehicle, displaceable contact means or current collector and in which said elongated tracks, grooves or slots extend along the roadway of the roadway sections or portions and wherein said contact means is coordinated with a vehicle related control equipment or an arrangement for creating an adaptation of the contact means at least to offer a mechanical and electrical contact to said conductor or strip, wherein a coordination between the voltage-carrying conductors allotted to the roadway sections or portions and the contact means of the vehicle occurs over coordinated current collectors, such as in the form of contact springs, adapted for mechanical and electrical cooperation with respective ones of the voltage-carrying conductors or strips, whereby said detector arrangement is related to the vehicle and its contact means.

In order to solve one or more of the technical problems mentioned above the present invention more specifically indicates that the thus known technology is to be supplemented by the characteristics that co-laterally with said track are in the roadway one or more electric conductors disposed, through which a current is adapted to pass for generating a magnetic field, and/or one or more permanent magnetized magnets for generating said magnetic field, that a first coil, related to the vehicle, is adapted to sense the variation of the magnetic field based on the distance from a track and/or the height of the coil over said track and to actuate current collector over a control equipment via associated auxiliary motors for cooperation with the track and the conductors, introduced into the track and being subjected to electric voltage.

Such as suggested embodiments falling within the frame of the basic concept of this invention, the characteristics disclosed by the sub claims are given in addition.

Thus the present invention is suggesting that it is the distances between the conductors related to the roadway and/or the magnets and a vehicle-related first coil are less than 15 centimeters, such as between 10 and 1 centimeter, respectively.

It is further suggested that said coil comprises two coil sections disposed after each other at right angles to the direction of driving the vehicle.

The control equipment is adapted, when the magnetic field has increased and begins to decrease, to affect auxiliary motors to lower said current collector into contact with conductors, subjected to voltage, at a minimum value.

The control equipment is adapted, when the magnetic field from two coil section has increased and begins to decrease towards "0", to calculate a maximized magnetic field and there to cause the auxiliary motors to lower the current collector into contact with conductors, subjected to voltage.

The control equipment is adapted to distinguish a minimum value or a maximum value relevant to identification of a false track from false values.

The coil sections are connected opposite to each other and that conductors for forming the magnetic field are allotted opposite directions of current and that the currents are chosen to be equal.

Advantages

The advantages which primarily must be considered to be characterizing of the present invention and the thereby indicated specific significant characteristics are that thereby prerequisites have been created for a vehicle-related arrangement according to the preamble of claim 1.

The advantages which primarily must be considered to be characteristic of the present invention and the specific significative characteristics disclosed thereby are that hereby prerequisites have been created for in a detector arrangement related to vehicles, which arrangement is adapted for being able to determine or detect the presence of and the orientation of a track disposed along the stretch of the roadway, and for in a system adapted for an electrically and by one or more batteries in the form of a set of batteries conveyable vehicle's being driven along a stretch of a roadway to indicate that to a track in the roadway are one or more electric conductors to be adapted along the track, through which a current (direct current) is adapted to pass, to generate a well defined magnetic field and/or a number of permanent magnetized magnets for generating said magnetic field.

A first coil related to the vehicle is then to be adapted to sense, by its motion crosswise to the track, the variation of the magnetic field and to determine over a control equipment and its circuit arrangement a minimum value or a maximum value via said coil or coil sections and to affect the current collector over assisting auxiliary motors for cooperation with the track and the conductor introduced into the track and being possible to subject to electric voltage or vice versa.

The primary subject matter of a detector arrangement related to a vehicle in accordance with the present invention, is disclosed in the characterizing portion of the following patent claim 1.

SHORT DESCRIPTION OF THE DRAWINGS

Prior art and presently proposed embodiments exhibiting the significant characteristics related to the present invention will now as an example be described more specifically with reference to the accompanying drawings in which.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures, illustrated in the accompanying drawings, we have chosen terms and specific terminology with the purpose of thereby primarily clarifying the concept of the actual invention.

However, in this connection it should be noted that the terms chosen here shall not be seen as limiting solely to the terms utilized and chosen here and it should be understood that each such chosen term is to be construed such, that it in addition will be able to include all technical equivalents which operate in the same manner or essentially the same manner so as thereby to be able to achieve the same or essentially the same purpose and/or the same technical result.

Thus, with reference to the accompanying drawings, the basic prerequisites of the present invention are shown schematically and in detail, with the significant characteristics related to the invention being concretized in consequence of the now proposed and in the following more specifically described embodiments.

Figures 1, 1A:
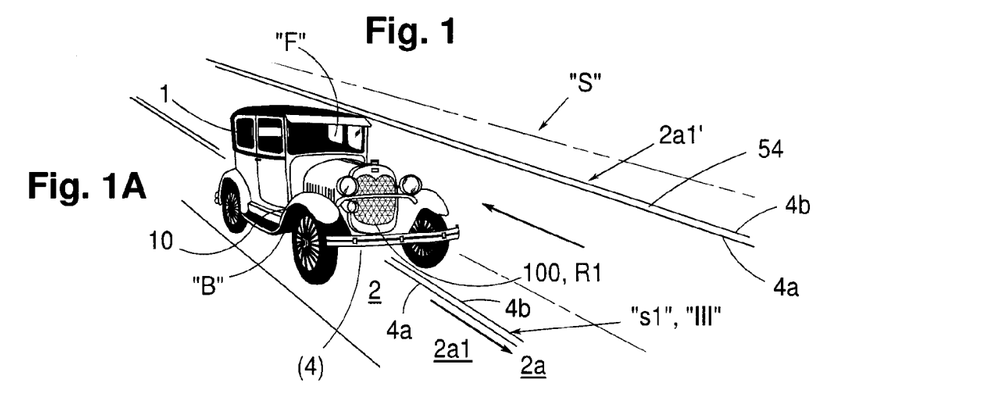
FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power as well as a control arrangement or control equipment intended for use in driving and steering the vehicle.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'.

Exteriorly the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box, as speed control and adapted power can occur over known electric and electronic circuits.

Figure 1B:
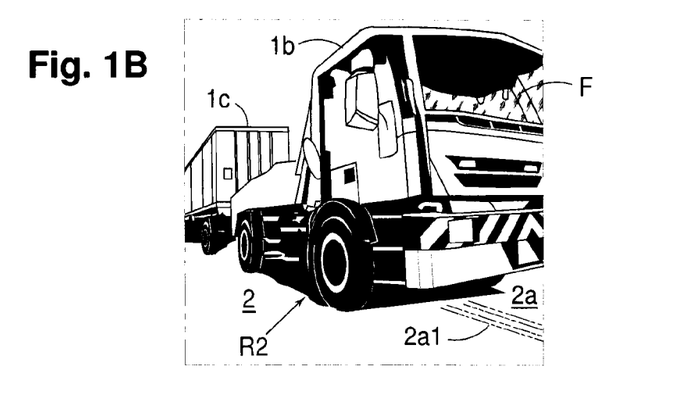
FIG. 1B shows a perspective view of a truck with a trailer and with a control circuit controlling the power in accordance with the basic principles of FIG. 1A.

In the same manner as FIG. 1A, FIG. 1B shows an electrically propellable truck 1b with a connected trailer 1c along the stretch of roadway 2, 2a and its associated roadway section or portion 2a1.

Figure 1C:
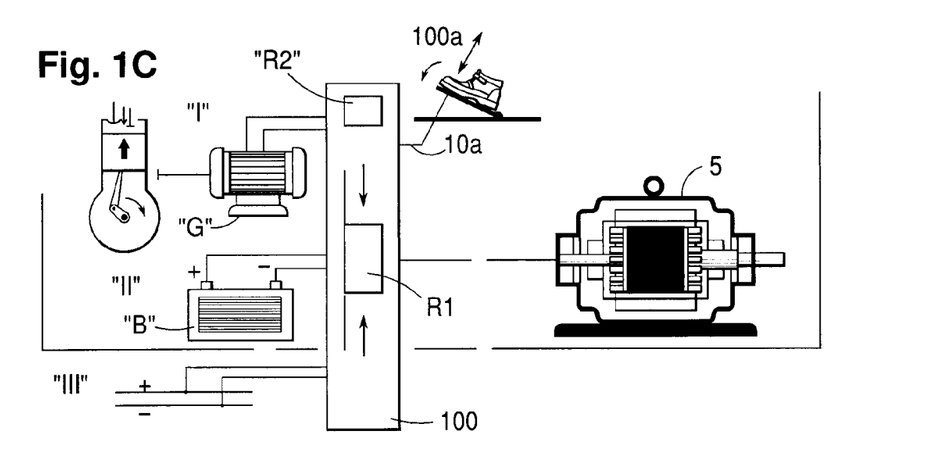
FIG. 1C shows in an overview three vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway and coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2"

FIG. 1C clearly shows three vehicle-related and vehicle-associated sources of power, which here are designated "I" and "II", a "first" one "I" in the form of a diesel generator "G", a "second" one "II" in the form of a battery or a set of batteries "B", and a "third" one "III" in the form of a source of power, positioned externally of the vehicle 1, here taking the form of parallel conductive surfaces, such as conductors, rails or strips, which may be subjected to power or voltage over switching means or switches and introduced into tracks, grooves and/or a cavity along each roadway section or portion along the entire stretch of the road 2.

In FIG. 1C the three sources of power are coordinated to a vehicle-related power control circuit 100, which in response to a power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

Figure 1D:
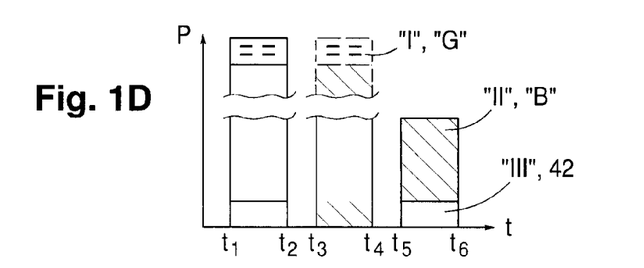
FIG. 1D illustrates a P/t-diagram (power/time), wherein full power or reduced power is to be transferred over the control circuit to the vehicle to pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary (third) source of power related externally to the vehicle or the peripheral (third) source of power.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how a complete removal of power from the three power sources "I", "II" and "III", respectively, can be carried out, with the power taken out from power source "I", illustrated at the top, the power taken out from power source "II", illustrated therebelow, and the power taken out from power source "III", illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II", and a small surplus can be permitted to be fed to the motor 5 and trickle charge the battery set "II", "B".

The invention is based on that the set of batteries "B" and the second power source "II" but particularly the third power source "III" primarily shall, over the distributing circuit "R1", supply motor 5 with power and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B", such as around 25%.

The supply of power or voltage to motor 5 can be chosen as +400 VDC and −400 VDC, i.e. the voltage value of 800 VDC is to be fed to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100 and for creating a necessary power and/or a speed control via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

Figure 4:
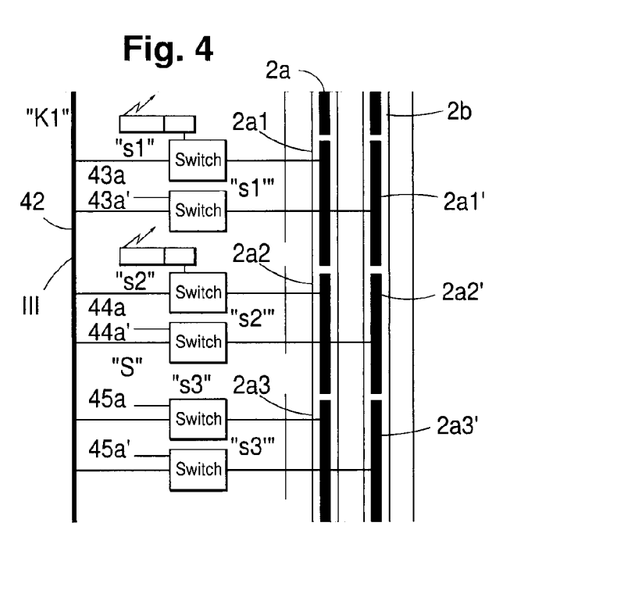
FIG. 4 shows an example of an electric arrangement in which a number of road sections or portions are provided with parallel contact surfaces as conductors or strips under power or tension, each one being connectable over a switch to its vehicle external or peripheral electric station and in which roadway section or portion after roadway section or portion may be activated and are placed under power of voltage by activating a coupling means or a switch over a control unit as said vehicle passes roadway section after roadway section.

The stretch of a roadway 2 is in FIG. 4 shown divisible into road sections or portions 2a (2a1, 2a2, 2a3); 2b (2a1', 2a2' and 2a3'), wherein each one to advantage can be allotted to an external power source "III", which here is illustrated as a number of electric stations "s1", "s2", "s3"; "s1'", "s2'", "s3'".

Of the third power source "III", "s1" external to the vehicle 1 and/or the first power source "I", "G" associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power source of energy "III", any additional necessary power and energy for driving the vehicle 1 over a road section or portion 2a1 can be supplied via power source "I", "G" associated with the vehicle.

Figure 2:
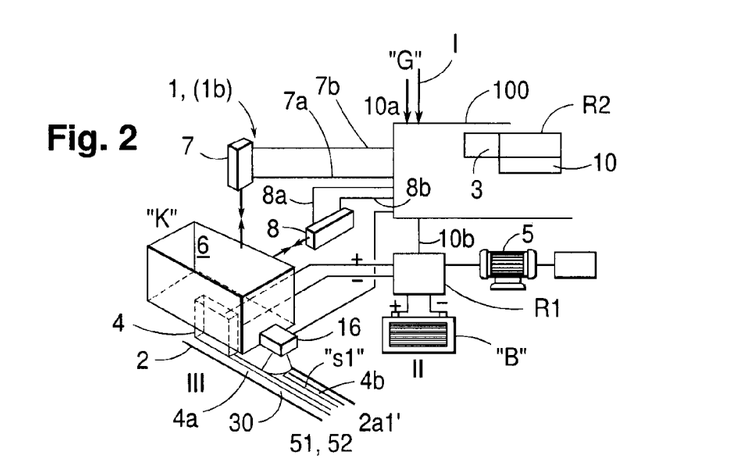

FIG. 2 basically shows an electrical/mechanical switching arrangement "K" related to a vehicle 1, (1b) in a schematically illustrated vehicle-related arrangement in the form of control equipment 10 for controlling a contact member or a current collector or collector 4, associated with the vehicle 1, and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having control equipment 10, and signals on the second conductor 7b and 8b are generated in the same central circuit 100 while utilizing position sensors (not shown).

Said power control circuit 100 with control equipment 10 is a complex unit, which i.a. over a sensor 16 is to be able to sense the existence of and the orientation of conductor surfaces, as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributes the energy sources is supplied to motor 5 and is here controlled by throttle arrangement 100a. For this purpose circuit "R2" will have to be controlled directly by said throttle arrangement 100a (FIG. 1C) so as to supply motor 5 with the required power over the circuit "R1".

In the illustrated position the current collector or remover 4 conducts current and voltage from power source "s1", "III" over to the power and energy distributing circuit "R1".

The latter or a control circuit "R2" senses the power requirement of motor 5 over its central unit 100 and primarily feeds motor 5 with the power it needs according to the input signal on the connection or conductor 10a and generated output signal on the connection or conductor 10b so as thereby to load the stationary system "III", "s1" and supplement the power and energy requirements over battery setting "II", "B".

Connecting in parallel the power "III", "s1" taken out of the vehicle externally and the power "I", "G" and/or "II", "B" generated within the vehicle can here be carried out over circuit "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2", and control equipment 10.

Figure 3:
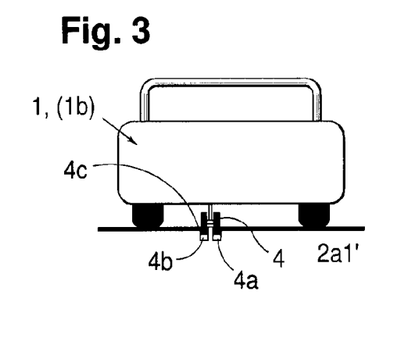
FIG. 3 shows an end view of a vehicle with its downwardly directed contact means or current collectors in the form of sliding contacts in cooperation with two individual contact surfaces, such as conductors, strips or rails allotted to the road section or portion and being under power or tension.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

This invention and its detector arrangement will now be described with reference to FIGS. 5 to 11, respectively.

Figure 5:
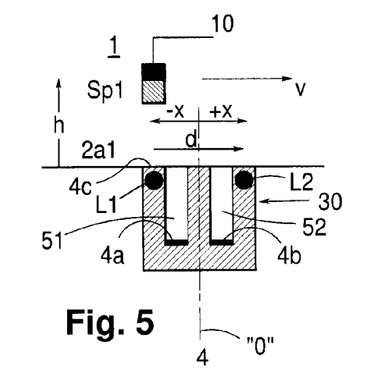
FIG. 5 illustrates a first embodiment of a detector arrangement, in accordance with the present invention, wherein a canalization allotted to the roadway exhibits two tracks with introduced conductors, which may be subjected to electric voltage, and to two conductors for generating a magnetic field as well as a first coil allotted to one single vehicle and sensing the variation of the magnetic field during the movement of said coil.

Thus, FIG. 5 shows an arrangement in which collaterally to said tracks 51, 52 in the roadway 2a1 or the canalization 30 one or more electric conductors L1, L2 have been disposed, through which a direct current is adapted to pass so as to generate a magnetic field. Alternatively, permanently magnetized magnets for generating said magnetic field may be located in the positions represented by conductors L1, L2.

A first coil Sp1, related to vehicle 1, is adapted to sense by its relative motion over tracks 51, 52 the variation of the magnetic field "B" and to affect said current collector 4 over control equipment 10 by means of associated auxiliary motors 7, (8) for cooperation with the track and the electric conductors 4a, 4b, which may be subjected to voltage, and which are disposed at the bottoms of tracks 51, 52.

The distance "h" between conductors L1, L2 related to roadway 2a1 and/or the magnets and coil Sp1, which is related to the vehicle, is adapted to be less than 15 centimeters, such as between 10 and 1 centimeter.

Figure 6:
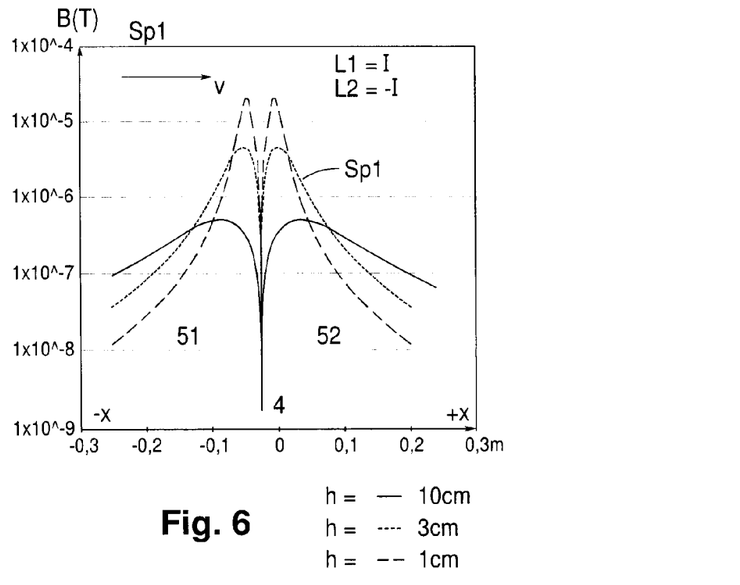
FIG. 6 illustrates in a graph the variation of the magnetic field at different distances of height (height "h") between the magnetizing field related to the canalization and the coil and different distances (−x; +x) from the middle of the track.

Reference designation "d" indicates a chosen distance between conductors L1, L2, and reference designations "−x" and "+x" have the purpose of indicating the distance which coil Sp1 is located from a central plane "0" for tracks 51 and 52, respectively, or conductors L1, L2, respectively, and so as to enable the orientation of tracks 51 and 52 to be able to bring down contact means 4 to cooperation with tracks and conductors 4a, 4b. Conductor 4c is connected to ground or zero potential FIG. 6 illustrates the distance-dependent ("−x"; "+x") variation "B" of the magnetic field for three different heights "h", where it may be seen that coil Sp1 indicates a minimum at central plane "0". Conductors L1 and L2 are supplied with equal currents but in opposite directions, which results in the shapes of the curves according to FIG. 6.

Figure 7:
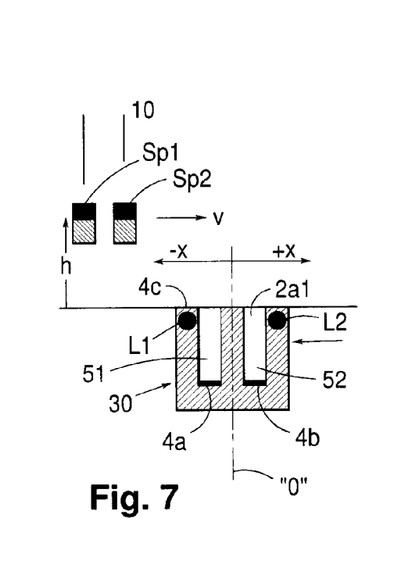
FIG. 7 illustrates a second embodiment of a detector arrangement, in accordance with the present invention, wherein a canalization allotted to the roadway exhibits two tracks having conductors that may be subjected to electric voltage disposed therein and with two coil sections allotted to the vehicle for sensing the variation of a magnetic field at different distances in height (height "h") and different distances (−x; +x) from the middle of the track.

FIG. 7 illustrates that said coil consists of two coils Sp1, Sp2 disposed after each other at right angles to the direction of driving the vehicle 1.

Reference numerals "−x" and "+x" have the intention of indicating the distance of coils Sp1, Sp2 from a central plane "0" of tracks 51 and 52 or conductors L1, L2 and for being able to determine the orientation of tracks 51 and 52 and for being able to bringing down contact means 4 to cooperation with the rails and conductors 4a, 4b.

Figure 8:
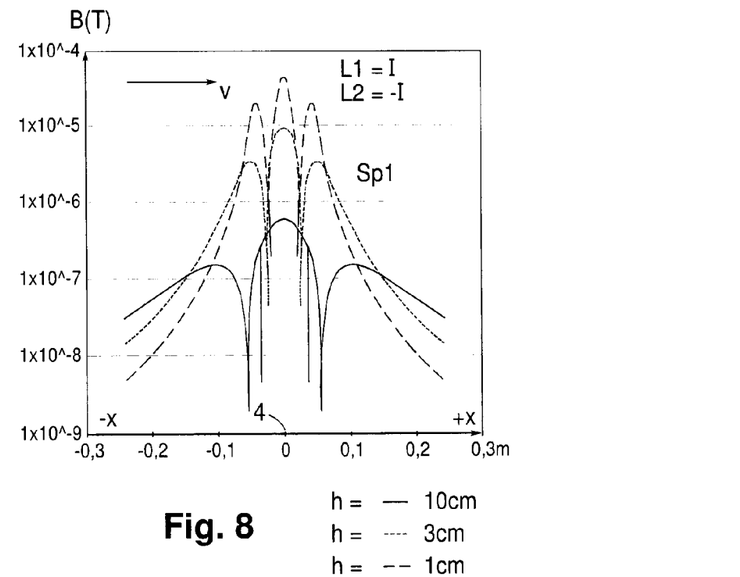
FIG. 8 illustrates in a graph the variation of the magnetic field at different distances (height "h") between the canalization and the coils in accordance with FIG. 7.

FIG. 8 illustrates the distance-dependent ("−x"; "+x") variation "B" of three different heights "h", where it may be seen that coils Sp1, Sp2 indicate a maximum at central plane "0". Conductors L1 and L2 are supplied with equal currents in opposite directions, which results in the shapes of the curves according to FIG. 8 when coils Sp1 and Sp2 are connected opposingly to each other.

Control equipment 10 is adapted, when the magnetic field has increased and begins to be reduced, to affect auxiliary motors 7, (8) according to FIG. 2 so as to lower the current collector 4 to contact with conductors 4a, 4b subjected to voltage.

Furthermore, control equipment 10 is adapted, when the magnetic field "B" of coils Sp1 and Sp2, respectively, has increased and begins to decrease towards "0" according to FIG. 8, to calculate or wait for a maximized magnetic field "B" and make auxiliary motors 7, (8) lower current collector 4 into contact with conductors 4a, 4b subjected to voltage.

Control equipment 10 is also adapted to separate a minimum value from a maximum value over circuits, said values concerning false identification of a track from false values.

The two coils Sp1, Sp2 are disposed the same vertical distance "h" from parallel electric conductors or magnets related to tracks 51, 52 and/or roadway section 2a1.

The principle of the invention is based on the knowledge that by disposing cables L1, L2 in roadway section 2a1 a detector 16 adjacent to current collector 4 can detect a magnetic field from coil Sp1 in FIG. 5 or from coils Sp1; Sp2 in FIG. 7 so as to thereby localize the positions of tracks 51, 52, respectively.

In order to avoid mistakes, a frequency which normally does not occur is used. It is necessary to avoid network frequency and harmonics of the network frequency. Hereby the detectors can be made very selective by filtrating in narrow bands with high amplification.

Thus, FIG. 6 has the purpose of illustrating the variations of the magnetic fields at three different distances and heights "h" from the current carrying conductors L1, L2, with "h" chosen to 10 centimeters, 3 centimeters and 1 centimeter at increasing B-values.

There may be difficulties in determining, from these data, when current collector or contact 4 is to be lowered down into tracks 51, 52. It is particularly troubling that field "B" increases and then reduces from "−x" to "0" and therefrom increases with "+x". It is at a minimized field strength that contact 4 is to be lowered.

By introducing two coils Sp1, Sp2 according to FIG. 7 a more sophisticated assessment can be carried out.

FIG. 8 illustrates the subtracted sum of the magnetic fields in two coils Sp1, Sp2 being located at the same distance from each other as the width of tracks 51 and 52, respectively, in roadway section 2a1.

A maximum magnetic field "B" is achieved when contact 4 and coils Sp1, Sp2 are located directly over tracks 51, 52. This makes the safety of bringing down contacts 4 at the right moment to increase.

However, it can still be difficult in certain cases to find the absolute maximum value as it cannot be ignored that there may be local maximum values at wrong places.

If the following function is studied, viz.:

$$F(x,h):|B1(x,h)+B2(x,h)|/|B(x,h)|$$

where B1 is the field of detection by coil Sp1 as a function of the distance from track 51 and the height over road section 2a1

B2 is the field of detection by coil Sp2 as a function of the distance from track 51 and the height over road section 2a1, and B is the total of two fields.

Figure 9:
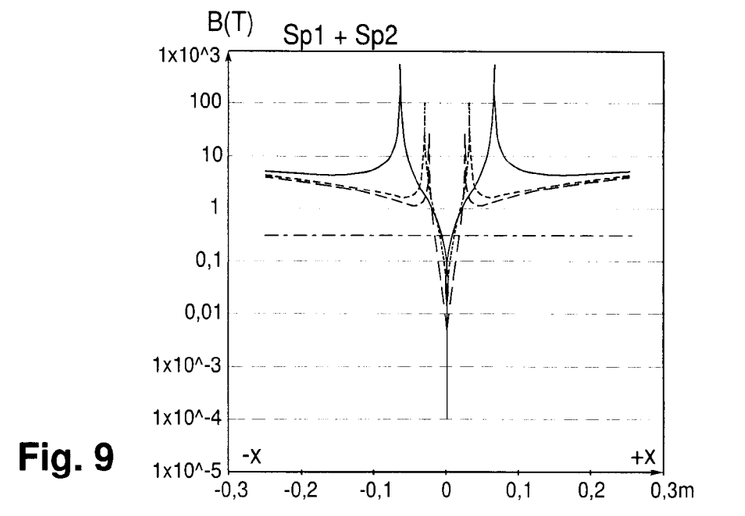
FIG. 9 illustrates a magnetic field in a graph in accordance with FIG. 8 in a specific calculation.

The curve form, according to FIG. 8, can be transferred to a curve form according to FIG. 9 where coils Sp1 and Sp2, respectively, are connected in series.

FIG. 9 then shows the function at a height "h" of 10 centimeters, 3 centimeter, and 1 centimeter, respectively, over roadway 2a1 and provides distinct values "B2" under a reference.

It may be seen that, the function provides a pronounced low value in the vicinity of the value "0" and track 51 and 52, respectively. This can be used for removing the local maximum values.

Form a new function according to:

$$f1(x,h)=1 \text{ if } f(x,h)<uref$$

$$f1(x,h)=0 \text{ if } f(x,h)<uref.$$

Figure 10:
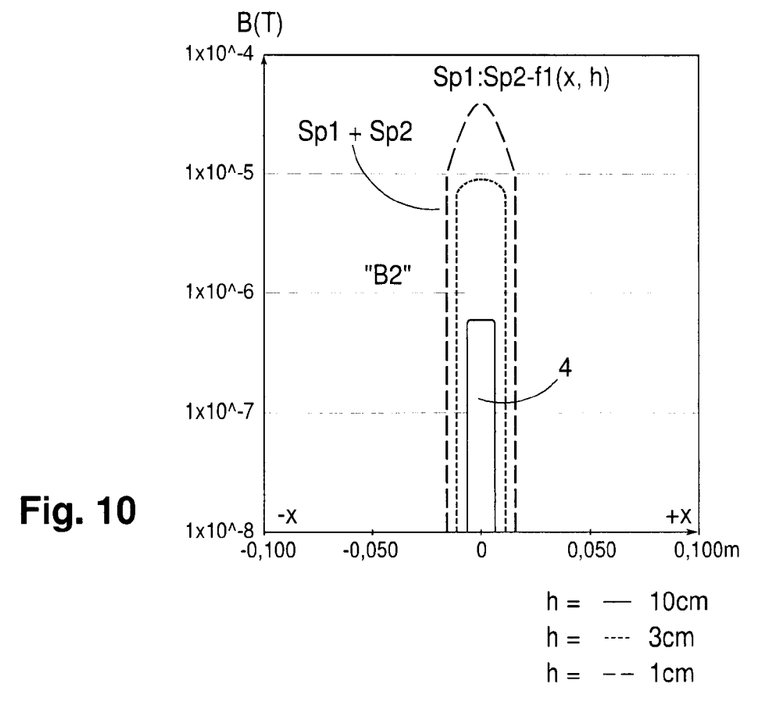
FIG. 10 illustrates in a graph a magnetic field received over two coils related to the vehicle when its value has been multiplied with a function.

According to FIG. 10, this provides a high value close to track 51 and 52, respectively, but "0" further away on the "x" scale from the "0"-point.

The value "uref" is chosen such that this value becomes "0" at the local maximum values. However, the value "uref" can be chosen within a fairly broad interval.

Function f1 $(x, h)$ is multiplied with the B fields from the two coils Sp1, Sp2 below the "ref" value of FIG. 7 so as to form the graph of FIG. 10.

As may be seen, a distinct signal is achieved very close to the center of tracks 51, 52, respectively. Checking is now carried out to find the maximum value and to lower contact 4 there. Then tracks 51 and 52, respectively, will lie exactly in the right places without danger of confusion with false values.

Figure 11:
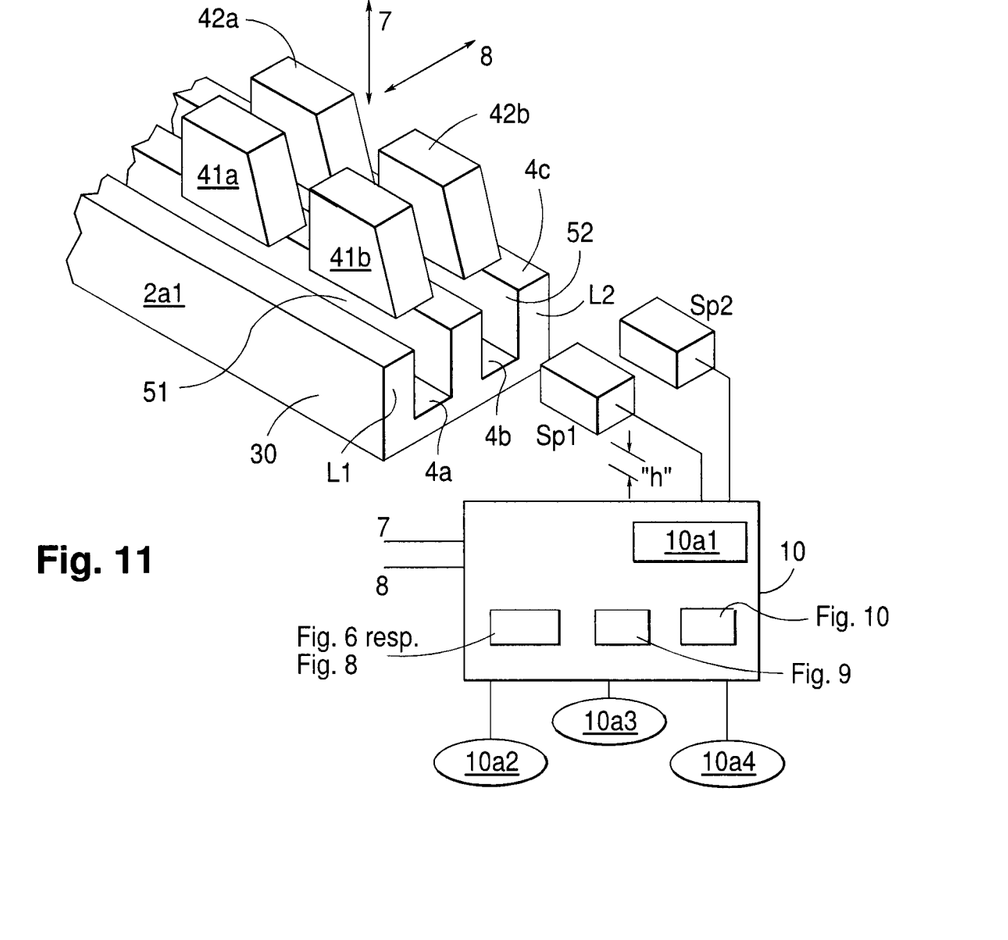
FIG. 11 illustrates in a perspective view the embodiment of FIG. 7 having two coil sections or coils sensing varying magnetic fields connected to a control equipment for in response to stored criteria affecting a first auxiliary motor to bring the current collectors down for cooperation with electric conductors or vice versa and/or to be able to affect a second auxiliary motor to dispose the current collectors in a horizontal direction over the tracks with the electric conductors.

Thus, FIG. 11 has the purpose of illustrating the embodiment of FIG. 7 more specifically.

It may be seen that FIG. 11, in a somewhat modified embodiment, can be used in the embodiment of FIG. 5.

Pairs of current collectors 42a, 42b of a second track 52 are here disposed in a simplified fashion immediately above track 52.

The bottom of track 51 supports a conductor or a rail 4a, which may be subjected to voltage or which is subjected to voltage, whereas the bottom of track 52 supports a conductor or a rail 4b.

According to the instructions of the invention and with reference to the embodiment of FIG. 7, the existence of two coils Sp1 and Sp2, respectively, is indicated, which are solidly related to current collectors 41a, 41b and 42a, 42b and which are horizontally to follow along in the horizontal movement of the current collectors for detecting the existence of and the momentary position of tracks 51 and 52, respectively, which are solidly related to tracks 51 and 52, respectively.

The sensed signals from coils Sp1 and Sp2, respectively, which are dependent of the momentary magnetic field from conductors L1 and L2, respectively, are supplied to control equipment 10 as input signals.

Over a calculating circuit 10a1 and considering stored criteria in memories, an output signal is generated for causing auxiliary motor 7 to lower current collectors 41a, 41b and 42a, 42b, respectively, down towards conductors 4a, 4b and for electric cooperation with these.

Calculating circuit 10a1 can also generate an output signal for affecting auxiliary motor 8.

Magnetic fields are stored in memory 10a2 in dependence of the horizontal distance from the track, the vertical distance "h" is stored in memory 10a3, and other relevant criteria are stored in memory 10a4.

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

Some of the following reference numerals have been introduced into FIGS. 1 to 4;

a. 1. Vehicle illustrated as a Ford Model A.
b. 1b. Truck
c. 1c. Trailer to truck "b".
d. 2. Stretch of a roadway
e. 2a. Roadway in one traveling direction
f. 2b. Roadway in an opposite traveling direction
g. 2a1. Roadway section in one traveling direction
h. 2a1'. Roadway section in an opposite direction
i. 3. Steering equipment
j. 4. Vehicle related contact means as current remover
k. 4a. Electrical conductive first rail
l. 4b. Electrical conductive second rail
m. 4c. Roadway section related electrical conductor
n. 4a'. Electrical conductive first surface
o. 4b'. Electrical conductive second surface
p. 5. Vehicle related DC-motor
q. 6. Support for vehicle related contact means (j)
r. 7, 8. Auxiliary motors
s. 10. Control equipment for contact means (j)
t. 30. Canalization for electric conductors (k, l, m.) and including grooves (u, v.)
u. 51. First roadway section related groove
v. 52. Second roadway section related groove
w. 100. Power control circuit
x. "I". First vehicle related power source (Generator)
y. "II". Second vehicle related power source (Battery set.)
z. "III". Third power source, vehicle external (Ground Station)
aa. "F". Driver (not shown.)
bb. "R1". Energy distributing and three power sources controlling circuit
cc. "R2". Control circuit for energy distribution (Speed control)
dd. "S". Vehicle and roadways related system

The invention claimed is:

1. A vehicle-related detector arrangement related to a contact means in a system for propelling an electrically propellable vehicle, by one or several batteries or a set of batteries along a roadway, the system comprising:
   a plurality of roadway sections for subdividing the roadway, wherein each one of the roadway sections comprises one or more elongated tracks or slits having conducting rails introduced therein adapted to be supplied with current and put under voltage, and being connectable over a switch to one or more vehicle-external power sources, including electric stations, for thereby enabling charging said set of batteries belonging to the vehicle but primarily driving the vehicle over the set of batteries along the roadway and the roadway sections and
   one or more powerable vehicles which may be driven by means of an electric motor or motors, with each of the respective vehicles comprising a control circuit adapted for necessary distribution of power, and for providing a required power and/or speed control, wherein an underneath side of said vehicle is provided with contact means displaceable up and down and sideways, in relation to the direction of transportation of the vehicle,
   wherein said elongated track or tracks and the conducting rails extend along the stretch of the roadway and wherein said contact means is coordinated with vehicle-related control equipment for creating an adaptation of the contact means so as to at least offer a mechanical and electrical contact with said conducting rails,
   wherein coordination between the conducting rails, arranged in the roadway section and the contact means of the vehicle occurs via coordinated current collectors, in the form of contact springs adapted for mechanical and electrical cooperation with respective ones of the conducting rails put under voltage,
   wherein the system comprises one or more electric conductors disposed collaterally with said track in the roadway, through which a current is adapted to pass, and/or one or a plurality of permanent magnets, for generating a magnetic field,
   wherein the detector arrangement comprises a coil, related to the vehicle, and adapted to sense the variation of said magnetic field based on a distance from a track and/or a height of the coil above said track and to actuate, the contact means, over the control equipment by means of associated auxiliary motors, for cooperation with the track and the conductor.

2. A detector arrangement in accordance with claim 1, wherein the distance between the conductors and/or the magnets in the roadway and the vehicle-related coil is less than 15 cm.

3. A detector arrangement in accordance with claim 1, wherein said coil comprises two coils, disposed after each other in a direction perpendicular to the direction of driving of the vehicle.

4. A detector arrangement in accordance with claim 1, wherein the control equipment is adapted to actuate auxiliary motors to lower the contact means into contact with the conducting rails, when the magnetic field has increased and begins to decrease towards a minimum value.

5. A detector arrangement in accordance with claim 3, wherein the control equipment is adapted to calculate a maximum magnetic field and there to actuate the auxiliary motors to lower the current collector into contact with conducting rails, when the magnetic field sensed by the two coils has increased and begins to decrease towards zero.

6. A detector arrangement in accordance with claim 5, wherein the control equipment is adapted to distinguish a minimum value or a maximum value of the magnetic field from a predetermined value relevant to identification of a false track from false values.

7. A detector arrangement in accordance with claim 3, wherein the coils are connected opposite to each other and that the current passes through the conductors in opposite direction for generating the magnetic field.

8. A detector arrangement in accordance with claim 7, wherein the currents passing through the conductors are equal.

9. A detector arrangement in accordance with claim 2, wherein the distance is between 10 and 1 cm.

* * * * *